No. 853,719. PATENTED MAY 14, 1907.
R. M. A. B. MUNRO.
STEERING AND CONTROLLING DEVICE.
APPLICATION FILED MAR 8, 1905.
2 SHEETS—SHEET 1.
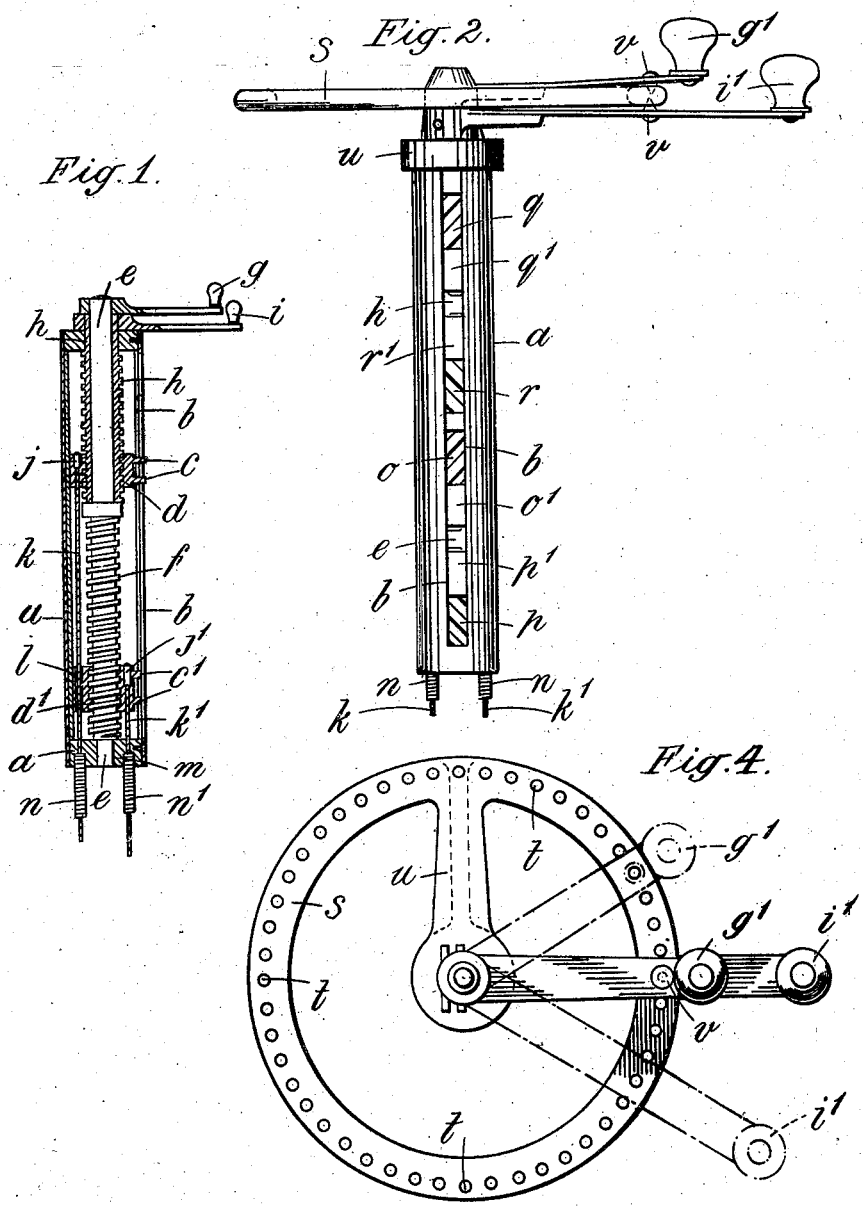

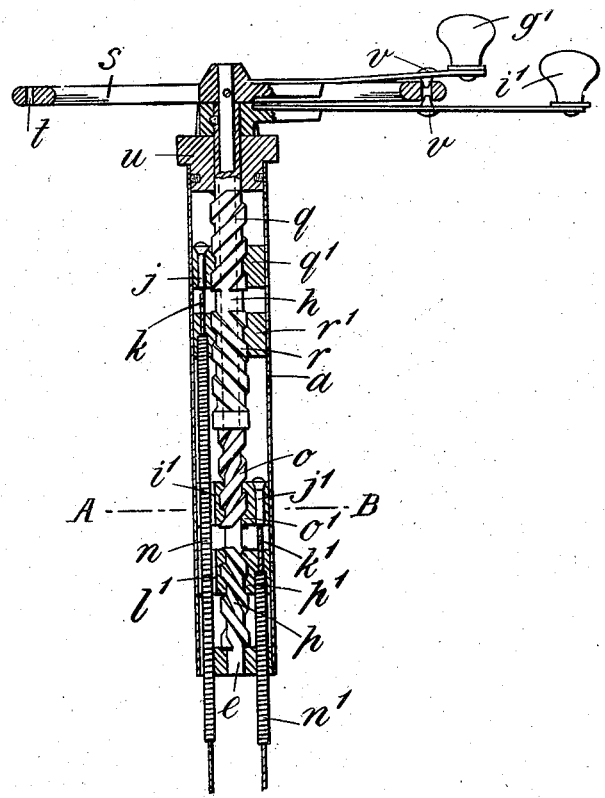
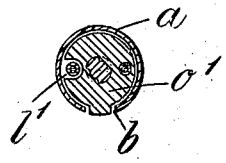

UNITED STATES PATENT OFFICE.

ROBERT MAGNUS AUGUSTUS BENJAMIN MUNRO, OF PARIS, FRANCE.

STEERING AND CONTROLLING DEVICE.

No. 853,719.

Specification of Letters Patent.

Patented May 14, 1907.

Application filed March 8, 1905. Serial No. 249,147.

*To all whom it may concern:*

Be it known that I, ROBERT MAGNUS AUGUSTUS BENJAMIN MUNRO, a subject of the King of Great Britain, residing in Paris, France, have invented certain new and useful Improvements in Steering and Controlling Devices for Automobiles and Like Vehicles, of which the following is a specification.

My invention relates to improvements in steering and controlling devices for automobiles and like vehicles, and has for its objects to arrange such steering and controlling members of the vehicle in a more convenient and compact manner than hitherto, to facilitate the operation of the several devices, and generally to effect the improvements hereinafter indicated.

According to my invention I arrange all or the majority of the controlling members of the vehicle above and in close proximity to the hand-wheel, without interfering in any way with the steering functions performed by the latter.

To effect this object I provide a tubular member which is fitted into the steering pillar, and such member is provided with screw-threaded rods which can be rotated from the upper extremity and in this way blocks or nuts are caused to travel longitudinally thereon, thus actuating flexible power-transmitting members passing down through the steering pillar.

In order that my invention may be clearly understood and easily carried out I will proceed to describe it with the aid of the accompanying drawings, in which Figure 1 is a longitudinal section of one form thereof, Fig. 2 is an elevation of a modified construction, Fig. 3 being a longitudinal section of the same, Fig. 4 is a plan view of Fig. 2, and Fig. 5 is a transverse section on the line A . . . B of Fig. 3.

Referring first to the construction illustrated in Fig. 1 of the drawings, I provide a tubular member $a$ fitted into or on the steering pillar, or extending therefrom, which incloses the whole of the controlling mechanism. The steering hand-wheel (not shown) may be mounted upon the upper or other convenient part of such tubular member or extension $a$ and the latter may be slotted or grooved longitudinally as seen at $b$ from end to end or within suitable limits to receive lugs $c$, $c^1$ of one or more internally screw-threaded sockets, blocks, nuts or the like $d$, $d^1$. The said nuts $d$, $d^1$ or the like are moved up and down in the manner hereinafter described within the said tubular member or extension $a$ and the lugs $c$, $c^1$ thereon prevent the same from turning in the said member $a$.

Extending down or fitted within such tubular member $a$ in suitable bearings is a central rod or spindle $e$ screw-threaded at its lower part $f$ and adapted to be rotated by a handle or lever $g$ formed on or secured to the upper extremity thereof. Upon such lower externally screw-threaded part $f$, which may be of any desired length, travels up and down the internally screw-threaded socket, block or nut $d^1$ and it will be seen that the operation of the handle $g$ effects such travel by means of the engaging screw-threads. Around the upper part of such central rod or tube $e$ may be loosely fitted in suitable bearings a further externally screw-threaded sleeve $h$ engaging with the socket, block or nut $d$ and capable of rotation by means of a handle or lever $i$ to effect the longitudinal and independent travel of such block or nut $d$. If desired any number of similar sleeves may be fitted each adapted to be operated by a suitable handle to effect the travel of an engaging block or nut as above described.

Each of the said blocks or nuts $d$, $d^1$ has fastened thereto or fixed therein by a nipple $j$, $j^1$ respectively or the like a wire or cable $k$, $k^1$ serving to control the operated device. As such blocks or nuts $d$, $d^1$ are arranged vertically one above the other the lower is provided with holes or slots such as shown at $l$ wherethrough the upper attached wires or cables may pass. If desired the said cables or wires may take the form of chains passing through brass or like tubes or over pulleys to the device to be operated. Preferably, however, the operating wires or cables $k$, $k^1$ are the inner members of the Bowden transmission mechanism, which consists of two flexible members, an inner operating wire and an outer spiral incompressible coil as described in the specification of prior Letters Patent of the United States No. 609,570 dated Aug. 23, 1898, granted to E. M. Bowden, and in this case a washer or the like $m$ with holes or openings therein fitted or held in the lower part of the tubular member or extension $a$ would form the stop for the abutment of the incompressible members $n$, $n^1$ of such operating mechanism.

The operating handles or levers $g$, $i$ do not require to be fixed to a quadrant; each may be capable according to the arrangement above described of being turned one or more complete circles so that the course of the nuts or blocks $d$, $d^1$ is practically unlimited and may if convenient be several inches according to the travel it is desired to give to the advance sparking, gas throttle or other valves or members to be operated.

Referring now to the modified construction illustrated in Figs. 2 to 5, I may arrange by means of the Bowden mechanism to overcome the objection sometimes made that it is awkward in practice to give more than one complete revolution to the operating handle or lever. A complete revolution even when using a coarse thread for the actuated blocks or nuts does not give a pull to the cable of more than about an inch at the operated end. By so arranging the Bowden mechanism as to move both the inner and outer members away from each other at the actuated end, that is to say, while giving a pull upon the inner to also give a push upon the outer or vice versa, twice the movement or pull is transmitted to the operated end by an equivalent actuation of the handle or lever, which in the case hereinbefore described would have only transmitted half the pull to the operated end.

According to this part of my invention, the tubular member $a$ and the longitudinal slot $b$ (shown in Fig. 5) are provided as before, a portion or lug of the blocks or nuts in each case extending into the slot to prevent their rotation, but the rod $e^1$ and sleeve $h^1$ are each here externally screw-threaded with two portions formed with opposite threads $o$, $p$ and $q$, $r$ respectively. Upon each of these oppositely threaded portions is arranged a block or nut $o^1$, $p^1$, $q^1$, $r^1$ similar to those above described, the upper block or nut $q^1$ being attached to the nipple $j$ of the inextensible member $k$ and the lower $r^1$ being bored to two diameters and thus providing an abutment for the incompressible member $n$. Slots or openings $l^1$ in the blocks or nuts $o^1$, $p^1$ allow the incompressible member $n$ to pass freely therethrough with the inextensible member $k$ therein. The two lower blocks or nuts $o^1$, $p^1$ are constructed in similar manner to take the nipple $j^1$ of the inextensible member $k^1$ and to form a stop for the incompressible member $n^1$ respectively.

Upon the actuation of the lever or handle $g^1$, the rod $e^1$ is rotated, and by reason of the opposite threads $o$ and $p$, the blocks or nuts $o^1$, $p^1$ are caused to travel away from or toward each other, both members of the Bowden mechanism being actuated at the same time, the blocks in traveling away from each other giving equally a pull upon the inextensible member $k^1$, and a push upon the incompressible member $n^1$, which actuation is converted at the operated end into a pull equal to the distance that the two nuts or blocks $o^1$, $p^1$ have been separated from each other. In like manner the handle or lever $i^1$, rotating the sleeve or tube $h^1$ operates the other length of Bowden mechanism. This arrangement of blocks or nuts can be adopted for any desired number of sleeves or tubular members in order to convert a small actuation of the lever or handle connected thereto into the amount of work required at the operated end.

A very convenient and compact construction to enable the handles or levers to be moved with precision and to be retained in any desired position is to provide a circular ring or rack $s$ having perforations $t$ therethrough, the said ring being held in position by an arm $u$ fixed to the tubular member $a$. The said handles or levers $g^1$, $i^1$ are so fitted as to travel around the ring $s$ above and below respectively. Studs $v$ upon the said levers engage in the said perforations $t$ on top and bottom and the levers being of spring form can be raised or lowered from such perforations in order to be rotated.

Although I have described the members as passing down inside the steering pillar yet it will be understood that the method of right and left-handed nuts or blocks could be also applied with advantage when the members passed outside the steering pillar or in any other convenient position.

What I claim as my invention and desire to secure by Letters Patent of the United States is:—

1. In steering and controlling mechanism for automobiles, the combination of a spindle, a sleeve mounted on said spindle, non-rotatable nuts threaded on said spindle and sleeve, and transmitting devices operated by said nuts.

2. In steering and controlling mechanism for automobiles, the combination of a threaded spindle, a threaded sleeve mounted thereon, means for rotating said spindle and sleeve, nuts threaded on said spindle and sleeve and held against rotation thereon, and transmitting devices connected to said nuts.

3. In steering and controlling mechanism for automobiles, in combination, a spindle, a sleeve mounted thereon, means whereby said spindle may be manually rotated in either direction, means whereby said sleeve may be similarly rotated, nuts threaded on said spindle and sleeve and held against rotation thereon, and transmitting devices connected to said nuts.

4. In steering and controlling mechanism, in combination, a tubular member having a longitudinal slot, a threaded spindle within said member, a threaded sleeve mounted to rotate on said spindle, means for rotating said spindle and sleeve, nuts threaded on said spindle and sleeve and having lugs projecting through said slot, and flexible transmitting devices connected to said nuts.

5. In steering and controlling mechanism, in combination, a spindle, a sleeve inclosing the same at one end, nuts threaded on said spindle and sleeve, means for preventing the rotation of said nuts on said spindle and sleeve, transmitting wires connected to said nuts, coils inclosing said wires, and a stop for said coils.

6. The combination of a threaded spindle, a threaded sleeve inclosing the same, nuts threaded on said spindle and sleeve and held against rotation thereon, and flexible transmitting members connected to both nuts, one of said members passing through one nut to the other nut.

7. The combination of a spindle having oppositely threaded portions, a sleeve mounted on said spindle and also having oppositely threaded portions, and non-rotatable nuts threaded on such threaded portions of said spindle and sleeve.

8. The combination of a spindle having oppositely threaded portions, a sleeve inclosing said spindle at one end and also having oppositely threaded portions, nuts threaded on such threaded portions of said spindle, other nuts threaded on the threaded portions of said sleeve, means for preventing the rotation of said nuts, transmitting wires connected to certain nuts on said spindle and sleeve, and transmitting coils inclosing said wires and abutting against the other nuts on said spindle and sleeve.

9. In steering and controlling mechanism for automobiles, in combination, a tubular member, a perforated ring mounted thereon, a spindle within said member, a sleeve rotatable on said spindle, transmitting mechanism operated by said spindle and sleeve, and levers connected to said spindle and sleeve above and below said ring and having studs to take into the perforations thereof.

In testimony, that I claim the foregoing as my invention, I have signed my name in presence of two subscribing witnesses.

ROBERT MAGNUS AUGUSTUS BENJAMIN MUNRO.

Witnesses:
JOHN BAKER,
PAUL F. PAQUET.